(No Model.)

W. C. WILCOX.
HORSE HITCHING DEVICE.

No. 331,016. Patented Nov. 24, 1885.

Witnesses,
Geo. H. Strong.

Inventor,
Wm. C. Wilcox
By Dewey & Co.
Attorneys

N. PETERS, Photo-Lithographer, Washington, D. C.

United States Patent Office.

WILLIAM C. WILCOX, OF SAN FRANCISCO, CALIFORNIA.

HORSE-HITCHING DEVICE.

SPECIFICATION forming part of Letters Patent No. 331,016, dated November 24, 1885.

Application filed April 1, 1885. Serial No. 160,948. (No model.)

*To all whom it may concern:*

Be it known that I, WILLIAM C. WILCOX, of the city and county of San Francisco, State of California, have invented an Improvement in Horse-Hitching Devices; and I hereby declare the following to be a full, clear, and exact description of the same.

My invention relates to a device for hitching or holding horses attached to vehicles.

It consists of a disk which is fastened to the hub of the vehicle, an exterior disk or rim having a groove in its periphery and a means for attaching the reins, and a frictional attachment intervening between the outer and inner disks, so that the outer disk may move freely in one direction and will be compelled to move with the inner disk in the opposite direction.

Figure 3:
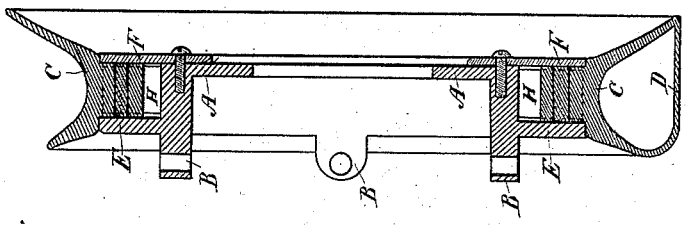
Figure 2:
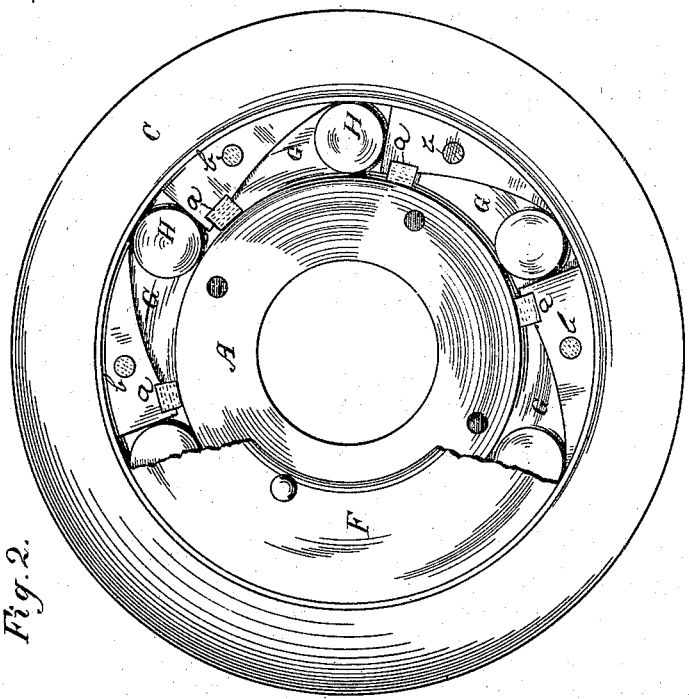
Figure 1:
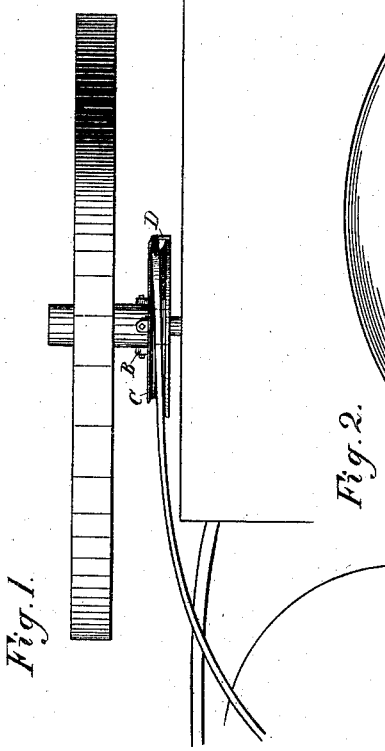

Referring to the accompanying drawings for a more complete explanation of my invention, Figure 1 is a view of my apparatus attached to a wheel-hub. Fig. 2 is an interior view showing the frictional or clutch mechanism. Fig. 3 is a section taken through the line of the axis.

A is a disk of any suitable dimensions and thickness, which is preferably fitted to slip upon the inner end of the forward wheel-hub of a vehicle, and it has lugs B, through which the screws or bolts may be introduced to secure it to the hub.

C is an exterior rim or pulley, having a grooved periphery in which the reins may lie, and a lug, D, to which they may be attached by a snap-hook or otherwise. A depression is made upon each side of this pulley. A thin flange, E, which extends outward from the inner disk, lies in one of these depressions, and a second flange, F, lies in the opposite one, and is united to the inner disk by screws or bolts. The exterior wheel or pulley, around which the reins are wound, has angular slots G formed in it, and within these slots elastic rollers H are placed, so that their peripheries will rest upon the exterior rim of the disk A, which lies within the plane of the outer rim or wheel. It will be seen by this construction that when the wheel-hub turns in one direction it will cause these rollers to bind between the rim of the disk A and the inner or angular sides of the slots in the outer wheel or rim, so that this will be carried around with the inner portion; but if turned in the opposite direction the rollers move up into a space which is wide enough to leave them loose and to allow the inner and outer rims to move upon each other freely.

In order to prevent any rattle or jar which might arise from the movement of the outer and inner disks upon each other or from side movements, I employ blocks of leather or other suitable material, which are inserted at the points of the inclines nearest the rim or flange A, as shown at *a*, and also in the side of the inclines, as at *b*, so that the side rattle within the flanges E and F will be prevented.

The operation of my device will then be as follows: The inner disk being secured to the wheel-hub, as before described, whenever it is desired to leave the team standing the reins are attached by a snap-hook or otherwise to the lug D on the outer rim or grooved pulley, and whatever slack there may be will be taken up upon turning the rim around in the direction toward which it moves freely until the reins are drawn as tight as may be desired. As long as the horse stands the device will remain in this condition, and if he should start the wheel, commencing to revolve, will carry with it the inner disk, and through the friction-rollers, which would bind against the sides of the inclined spaces of the outer rim, this latter would be caused to rotate and would wind up the reins, thus drawing the horse's head back until he was checked. Whenever the animal stops and commences to move backward, it will unwind the reins, and thus relieve him from their tension.

The device may be made very light, and forms a very effective hitching or holding device.

Having thus described my invention, what I claim as new, and desire to secure by Letters Patent, is—

1. A hitching or holding device for horses, consisting of an inner disk attached to the wheel-hub and an outer grooved rim having angular spaces upon its interior periphery, and rollers H, fitting transversely therein, and a lug or means for attaching the reins to the outer rim, substantially as herein described.

2. A hitching or holding device consisting of an inner disk attached to the wheel-hub and an outer grooved rim having angular spaces upon its inner periphery, transverse rollers H, fitting loosely within these angular spaces, and a lug, D, for attaching the reins, in combination with the buffers or block $a$ and $b$, substantially as herein described.

In witness whereof I have hereunto set my hand.

WILLIAM C. WILCOX.

Witnesses:
S. H. NOURSE,
H. C. LEE.